UNITED STATES PATENT OFFICE 2,120,544

CHLOROETHER ESTERS OF DIBASIC ACIDS

Herman A. Bruson, Philadelphia, Pa., assignor to Röhm & Haas Company, Philadelphia, Pa.

No Drawing. Application September 1, 1937, Serial No. 161,963

6 Claims. (Cl. 260—103)

This invention relates to new esters having the general formula

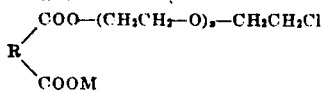

wherein R is a divalent hydrocarbon radical having from 2 to 6 carbon atoms, inclusive, $x$ is an integer not over 2, and M is a monovalent hydrocarbon radical of the aliphatic, arylaliphatic and cyclo-aliphatic series.

An object of this invention is to provide compounds useful as plasticizers for organic colloidal materials of resinous character, such as cellulose esters, cellulose ethers, phenolic-formaldehyde resins, polyvinyl esters, polyacrylic acid esters, and other analogous resins or film-forming materials.

Compounds of the above type where M is a short chain alkyl group, such as methyl, ethyl, propyl, or butyl are especially useful as plasticizers for cellulose acetate.

The above esters are prepared according to this invention by condensing the anhydride of a dibasic organic acid of the formula—

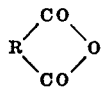

wherein R is a divalent hydrocarbon group having from 2 to 6 carbon atoms, inclusive, with a monohydric alcohol of the aliphatic, aromatic, or hydroaromatic series, so as to form a half ester; thereafter neutralizing the free carboxyl group of said half ester by means of an alkali metal base, and subsequently heating the salt thus formed with a dichloropolyethyl ether of the formula—

$$Cl—(CH_2—CH_2—O)_x—CH_2CH_2Cl$$

wherein $x$ is an integer not over 2.

The reactions involved can best be exemplified by the use of phthalic anhydride, ethyl alcohol, and β,β'-dichlorodiethyl ether as the reacting components, as follows:

I. 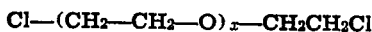

II. 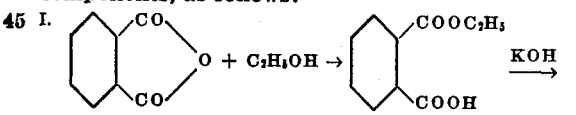

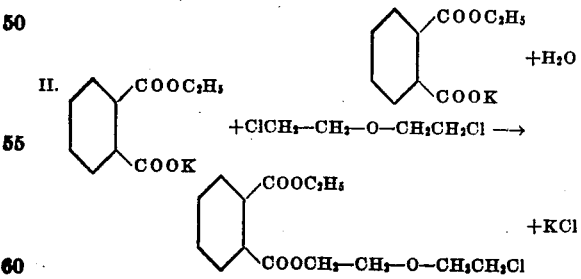

In Equation I the phthalic anhydride and the alcohol combine to form the half ester, which is then neutralized with potassium hydroxide. In Equation II the potassium ethyl phthalate thus obtained is condensed with the dichlorpolyethyl ether to yield the desired product, with the elimination of potassium chloride.

In practice, one can use sodium hydroxide, sodium carbonate, or potassium carbonate in place of the potassium hydroxide. The phthalic anhydride can be replaced by succinic, glutaric, adipic, or maleic anhydride, and finally any monohydric alcohol of the formula M—OH, where M is a hydrocarbon group, can be used in place of ethyl alcohol.

The β,β'-dichlorodiethyl ether can be replaced with β-chloroethoxy-β'-chlorodiethyl ether.

In order to illustrate this invention, the following examples are given, but it is understood that the quantities of the reactants, the time and temperature can be varied considerably, without departing from the spirit of the invention.

*Example 1*—A mixture consisting of 148 g. phthalic anhydride and 200 g. anhydrous methanol was boiled under reflux for six hours. After cooling, the solution was neutralized to phenolphthalein with a 20% potassium hydroxide solution in methanol. Then 200 g. β,β'-dichlorodiethyl ether were added. The solution was boiled for 35 hours under reflux. After cooling, the solution was filtered and the methanol removed from the filtrate by distillation. The residual oil was washed with water, dilute soda solution, and finally with water, and then distilled in vacuo. The product distilled at 185–190° C./0.5 mm., as a colorless oil, having the formula—

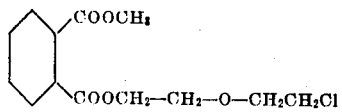

It is miscible in all proportions with cellulose acetate or nitrocellulose, and gives therewith clear films of excellent flexibility.

*Example 2*—The ethyl ester may be prepared as in Example 1, using 200 g. anhydrous ethyl alcohol in place of the methanol. It forms a colorless oil boiling at 205° C./4 mm., and also gives clear, flexible films with cellulose acetate or nitrocellulose.

*Example 3*—A mixture consisting of 100 g. succinic anhydride, and 109 g. cyclohexanol was heated for eight hours at 110–115° C. under a reflux condenser. The cooled solution was neutralized with a 5% solution of potassium hydroxide in ethyl alcohol, and then boiled with 200 g. β,β'-dichlorodiethyl ether for 25 hours. The solution was evaporated on the steam bath to remove alcohol, and the residue washed thoroughly with water and dilute soda solution. The oil obtained was distilled in vacuo. The product boiled at 199–203° C./5 mm. It is a colorless oil having the formula—

C₆H₁₁—OCO—CH₂CH₂—COO—
    CH₂CH₂—O—CH₂CH₂Cl

It gives a very soft plastic film with cellulose acetate in the ratio of 1:1 parts by weight on the dry basis.

*Example 4*—A mixture consisting of 98 g. maleic anhydride and 120 g. benzyl alcohol was heated 15 hours at 110–115° C. The cooled solution was then neutralized with 10% alcoholic sodium hydroxide solution and boiled with 200 g. β,β'-dichlorodiethyl ether for 30 hours. The filtered solution was washed with water and soda solution, and the oil distilled in vacuo. The product—

ClCH₂CH₂—O—CH₂CH₂OCO—CH=
    CH—COOCH₂C₆H₅ formed a colorless oil boiling at 150–160° C./0.5 mm.

*Example 5*—A mixture of 148 g. phthalic anhydride and 200 g. dry ethyl alcohol was boiled 12 hours under reflux, cooled, and neutralized with 10% alcoholic potassium hydroxide solution. Thereupon, 200 g. β-chloroethoxy-β'-chlorodiethyl ether, ClCH₂CH₂—O—CH₂CH₂—O—CH₂CH₂Cl, was added, and the solution boiled 40 hours under reflux. The product was filtered and the filtrate evaporated to remove the alcohol. The residual oil was washed with water and soda solution and then distilled in vacuo. The product came over at 215–218° C./1 mm. as a colorless oil having the formula—

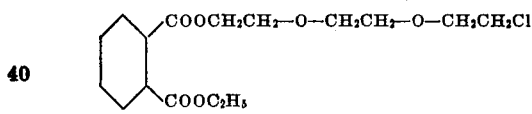

It is useful as a plasticizer for cellulose acetate.

*Example 6*—The half butyl ester of phthalic acid was prepared by heating 200 g. n-butanol with 148 g. phthalic anhydride while stirring for 8 hours at 100–110° C. It was converted to the potassium salt by neutralizing in the cold with a solution of 57 g. potassium hydroxide in 250 cc. ethyl alcohol. To the solution obtained, 200 g. of β,β'-dichlorodiethyl ether was added and the mixture boiled for 35 hours under reflux. The potassium chloride was filtered off and the alcohol removed by evaporation of the filtrate. The residual oil, after washing with water and dilute soda solution, was fractionally distilled in vacuo. The product came over at 205–210° C./1–2 mm. as a colorless oil, having the formula—

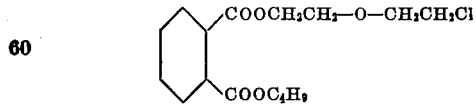

It is useful for plasticizing cellulose esters.

The above reactions are typical and are applicable also to other monohydric primary and secondary alcohols having more than four carbon atoms, such as amyl, hexyl, heptyl, octyl, decyl, undecyl, dodecyl, cetyl, oleyl, or octadecyl alcohols, terpene alcohols, such as borneol and fenchol, and aromatic alcohols, such as phenylethyl or benzyl alcohols. Due to the very high boiling points of the resultant chloropolyalkyl ether esters, these esters are preferably not distilled in vacuo, but isolated by removing any unchanged starting materials. They are pale yellow oils or low melting waxy solids.

What I claim is:

1. An ester of the general formula—

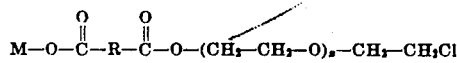

wherein R is a divalent hydrocarbon radical having 2 to 6 carbon atoms, inclusive; x is an integer not over 2, and M is a monovalent hydrocarbon radical of the aliphatic, arylaliphatic, and cycloaliphatic series.

2. An ester of the general formula—

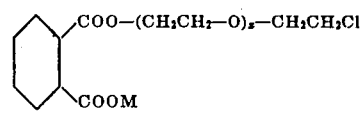

wherein x is an integer not over 2, and M is a monovalent hydrocarbon radical selected from the group consisting of alkyl, aralkyl, and cycloalkyl radicals.

3. An ester of the general formula—

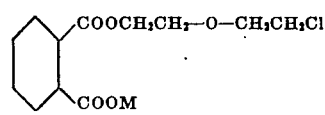

wherein M is in an alkyl group.

4. The compound having the formula—

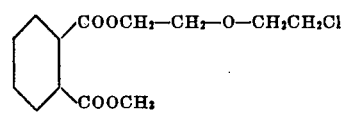

5. The compound having the formula—

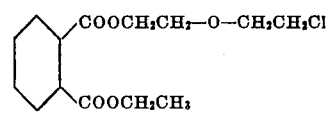

6. The compound having the formula—

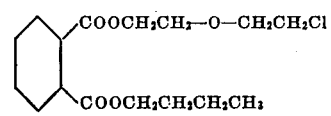

HERMAN A. BRUSON.